(12) United States Patent
Salter et al.

(10) Patent No.: US 9,586,527 B1
(45) Date of Patent: Mar. 7, 2017

(54) WHEEL WELL STEP ASSEMBLY OF VEHICLE

(71) Applicant: Ford Global Technologies, LLC, Dearborn, MI (US)

(72) Inventors: Stuart C. Salter, White Lake, MI (US); Annette Lynn Huebner, White Lake, MI (US); Cornel Lewis Gardner, Romulus, MI (US); James J. Surman, Clinton Township, MI (US); Paul Kenneth Dellock, Northville, MI (US)

(73) Assignee: Ford global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/157,535

(22) Filed: May 18, 2016

(51) Int. Cl.
*B60R 3/02* (2006.01)
*B60R 3/00* (2006.01)
*B60Q 1/26* (2006.01)

(52) U.S. Cl.
CPC .............. *B60R 3/02* (2013.01); *B60Q 1/2661* (2013.01); *B60R 3/002* (2013.01)

(58) Field of Classification Search
CPC  B60R 3/02; B60R 3/002; B60R 3/005; B60R 3/007
USPC ...................................... 280/164.1, 165, 166
See application file for complete search history.

(56) References Cited

U.S. PATENT DOCUMENTS

| | | | |
|---|---|---|---|
| 4,116,457 A * | 9/1978 | Nerem ...................... | B60R 3/02 280/166 |
| 4,802,069 A * | 1/1989 | Chandler ............... | B60Q 1/326 362/286 |
| 5,085,450 A * | 2/1992 | DeHart, Sr. ............... | B60R 3/02 280/166 |
| 5,238,268 A * | 8/1993 | Logan .................... | B62D 25/18 280/154 |
| 5,538,265 A * | 7/1996 | Chen ......................... | B60R 3/02 280/163 |
| 5,548,274 A * | 8/1996 | Anderson .............. | B60Q 1/326 152/523 |
| 5,558,426 A * | 9/1996 | Cabanatan ............. | B60Q 1/326 362/249.01 |
| 5,709,453 A | 1/1998 | Krent et al. | |
| 5,915,830 A * | 6/1999 | Dickson .................. | B60R 3/002 362/495 |
| 6,178,364 B1 * | 1/2001 | Delurey .................... | B60R 3/02 105/443 |
| 6,179,312 B1 * | 1/2001 | Paschke .................... | B60R 3/02 105/444 |
| 6,179,454 B1 * | 1/2001 | Hoines .................. | B60Q 1/323 362/495 |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Hau Phan
*Assistant Examiner* — Jacob Meyer
(74) *Attorney, Agent, or Firm* — Jason Rogers; Price Heneveld LLP

(57) ABSTRACT

A step assembly of a vehicle is provided herein. A step pad is pivotally coupled to a quarter panel of the vehicle and is movable between a stowed position and deployed position. At least one light source is provided in the step pad and the step pad transmits light emitted by the at least one light source in an outward direction.

17 Claims, 7 Drawing Sheets

(56) References Cited

U.S. PATENT DOCUMENTS

| | | | |
|---|---|---|---|
| 6,250,785 B1* | 6/2001 | Mallia | B60Q 1/323 362/495 |
| 6,264,222 B1* | 7/2001 | Johnston | B60R 3/02 105/444 |
| 6,416,209 B1* | 7/2002 | Abbott | B60Q 1/263 362/327 |
| 6,419,854 B1* | 7/2002 | Yocom | C09K 11/7731 252/301.4 S |
| 6,422,725 B1* | 7/2002 | Fong | B60Q 1/24 362/287 |
| 6,729,738 B2 | 5/2004 | Fuwausa et al. | |
| 6,773,129 B2 | 8/2004 | Anderson, Jr. et al. | |
| 6,851,840 B2 | 2/2005 | Ramamurthy et al. | |
| 6,871,986 B2 | 3/2005 | Yamanaka et al. | |
| 6,910,788 B2* | 6/2005 | Jones | B60Q 1/442 362/240 |
| 6,990,922 B2 | 1/2006 | Ichikawa et al. | |
| 7,017,927 B2* | 3/2006 | Henderson | B60R 3/02 280/163 |
| 7,118,150 B2* | 10/2006 | Bruford | B60R 3/02 296/37.1 |
| 7,213,923 B2 | 5/2007 | Liu et al. | |
| 7,264,366 B2 | 9/2007 | Hulse | |
| 7,264,367 B2 | 9/2007 | Hulse | |
| 7,413,205 B2* | 8/2008 | Watson | B60R 3/02 280/163 |
| 7,416,232 B2 | 8/2008 | Tier et al. | |
| 7,441,914 B2 | 10/2008 | Palmer et al. | |
| 7,621,546 B2* | 11/2009 | Ross | B60R 3/02 280/163 |
| 7,703,784 B2* | 4/2010 | Plavetich | B60R 3/02 280/164.1 |
| 7,736,034 B1 | 6/2010 | McNeal | B60Q 1/326 362/506 |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,038,164 B2* | 10/2011 | Stahl | B60R 3/00 280/166 |
| 8,071,988 B2 | 12/2011 | Lee et al. | |
| 8,203,260 B2 | 6/2012 | Li et al. | |
| 8,286,378 B2 | 10/2012 | Martin et al. | |
| 8,408,766 B2 | 4/2013 | Wilson et al. | |
| 8,421,811 B2 | 4/2013 | Odland et al. | |
| 8,466,438 B2 | 6/2013 | Lambert et al. | |
| 8,519,362 B2 | 8/2013 | Labrot et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,905,354 B2* | 12/2014 | Griffiths | B64C 1/24 182/89 |
| 8,919,853 B2* | 12/2014 | Krishnan | B62D 33/03 280/164.1 |
| 9,120,426 B1* | 9/2015 | Huebner | B60R 3/02 |
| 2002/0159741 A1* | 10/2002 | Graves | B60Q 1/26 385/133 |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2005/0006870 A1* | 1/2005 | Williams | B60R 3/02 280/166 |
| 2005/0073163 A1* | 4/2005 | Luetze | B60R 13/04 296/1.08 |
| 2005/0151340 A1* | 7/2005 | Leitner | B60R 3/02 280/166 |
| 2006/0087141 A1* | 4/2006 | Bruford | B60R 3/02 296/37.1 |
| 2006/0087826 A1 | 4/2006 | Anderson, Jr. | |
| 2006/0267308 A1 | 11/2006 | Decker, Jr. et al. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2010/0025954 A1* | 2/2010 | Gottlinger | B60R 3/02 280/166 |
| 2010/0301580 A1* | 12/2010 | Stahl | B60R 3/00 280/166 |
| 2012/0001406 A1 | 1/2012 | Paxton et al. | |
| 2012/0074841 A1* | 3/2012 | Liu | B60Q 1/2611 315/77 |
| 2012/0280528 A1 | 11/2012 | Dellock et al. | |
| 2013/0335994 A1 | 12/2013 | Mulder et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0224935 A1* | 8/2015 | Huebner | B60R 3/02 280/166 |
| 2016/0016506 A1* | 1/2016 | Collins | B60Q 1/268 362/464 |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2077238063 A | 9/2007 |
| WO | 2006047306 A1 | 5/2006 |
| WO | 2014068440 A1 | 5/2014 |

\* cited by examiner

WHEEL WELL STEP ASSEMBLY OF VEHICLE

FIELD OF THE INVENTION

The present invention generally relates to step pad assemblies of a vehicle, and more particularly, to step pad assemblies capable of illuminating.

BACKGROUND OF THE INVENTION

Vehicles having high clearance often feature step assemblies to assist a user in reaching various areas. A step assembly is provided herein for assisting a user in accessing higher parts of a vehicle and includes a step pad that is capable of illuminating to provide functional lighting as well as impart a stylistic element to the vehicle.

SUMMARY OF THE INVENTION

According to one aspect of the present invention, a step assembly of a vehicle is provided. A step pad is pivotally coupled to a quarter panel of the vehicle and is movable between a stowed position and deployed position. At least one light source is provided in the step pad and the step pad transmits light emitted by the at least one light source in an outward direction.

According to another aspect of the present invention, a step assembly of a vehicle is provided. An arched step pad is pivotally coupled to a rear quarter panel of the vehicle and is movable between a stowed position covering a wheel well trim member and a deployed position substantially parallel with a ground surface. At least one light source is provided in the step pad and the step pad transmits light emitted by the at least one light source in an outward direction.

According to yet another aspect of the present invention, a step assembly of a vehicle is provided. A step pad is pivotally coupled to a quarter panel of the vehicle and is movable between a stowed and deployed position. The step pad includes at least one portion configured to luminesce in response to excitation light by at least one light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
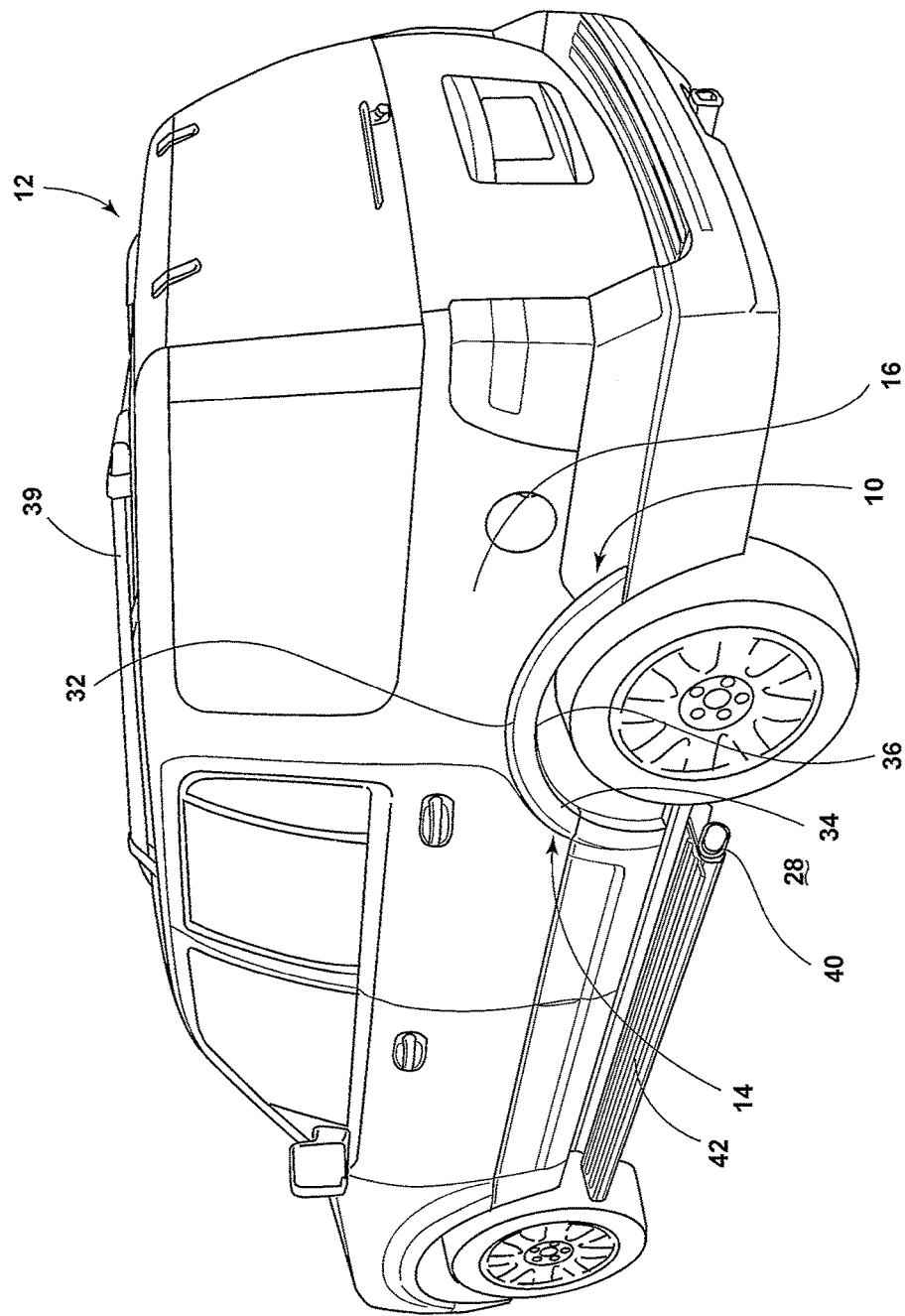
FIG. 1 is a side perspective view of a vehicle equipped with a step assembly having a step pad in a stowed position.
Figure 2:
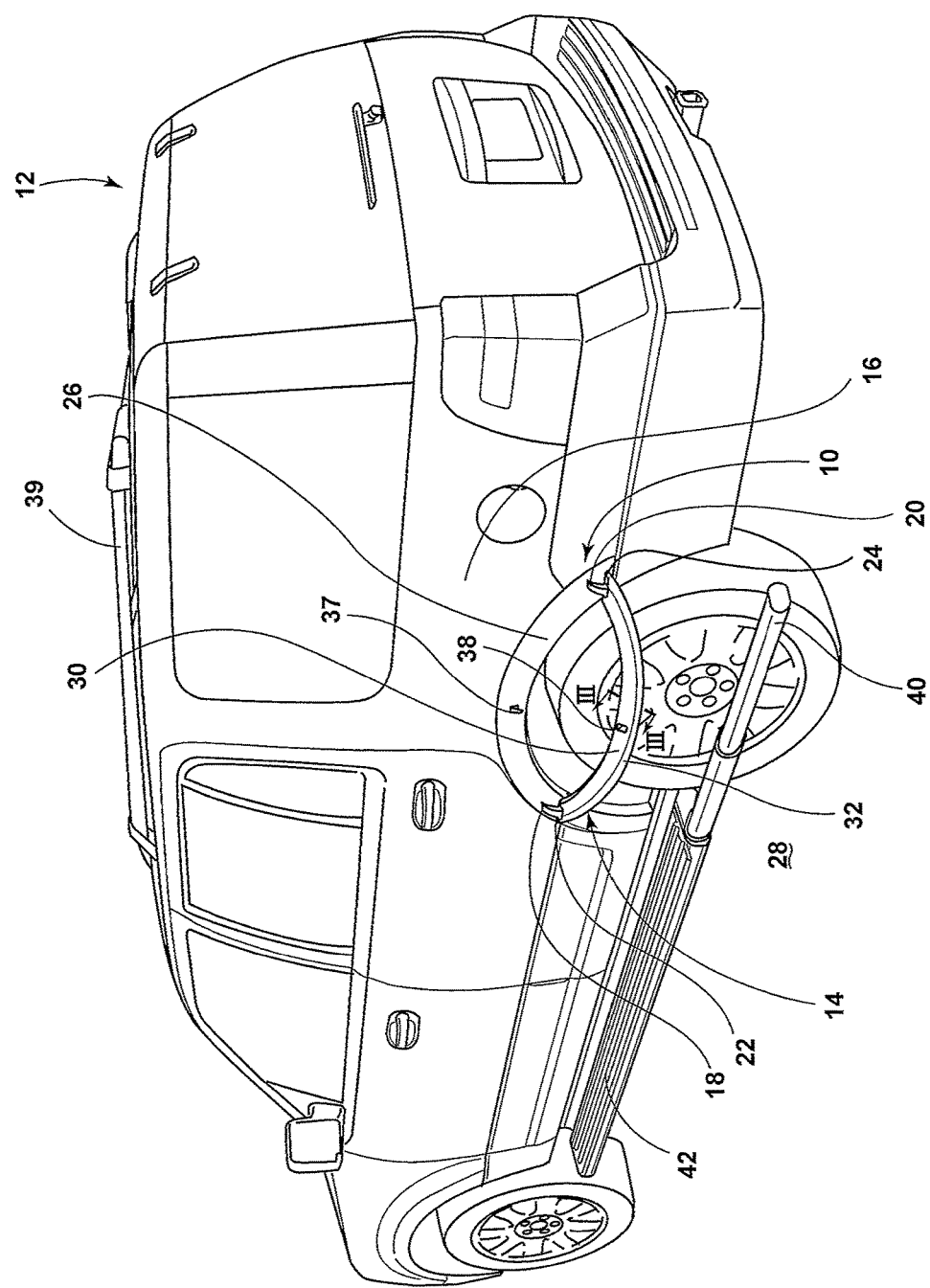
FIG. 2 is a side perspective view of the vehicle, wherein the step pad is in a deployed position.

Referring to FIGS. 1 and 2, a step assembly 10 is shown and is equipped on a vehicle 12 exemplarily embodied as a sports utility vehicle (SUV). The step assembly 10 includes a step pad 14 pivotally coupled to a quarter panel (e.g., rear quarter panel 16) of the vehicle 12 via a pair of hinges 18, 20 provided at opposing ends 22, 24 of the step pad 14. In the depicted embodiment, the step pad 14 is arched and movable between a stowed position (FIG. 1) covering a wheel well trim member 26 and a deployed position (FIG. 2) substantially parallel with a ground surface 28. The step pad 14 may be contoured according to the shape of the wheel well trim member 26 so that the presence of the step pad 14 is generally concealed when in the stowed position. In the depicted embodiment, the step pad 14 includes a step area 30 defining a top portion of the step pad 14 when the step pad 14 is in the deployed position, a first side 32 corresponding to an outer perimeter wall of the step pad 14, a second side 34 corresponding to an inner perimeter wall of the step pad 14, and a bottom portion 36 that faces outward from the vehicle 12 or toward the ground surface 28 when the step pad 14 is in the stowed position or the deployed position, respectively. The step pad 14 may include a retention member, such as a clip 37 configured to engage a complimentary portion 38 of the step area 30 to secure the step pad 14 in the stowed position. It is contemplated that movement of the step pad 14 between the stowed and deployed positions may be achieved through manual manipulation or otherwise achieved through the use of actuators operably coupled to the retention member. In operation, the step pad 14 may be moved to the deployed position to allow a user to stand on the step area 30 to gain additional clearance in order to access higher points of the vehicle 12, such as, but not limited to, a roof rack 39 of the vehicle 12. Accordingly, the step area 30 may be treaded to provide additional stability to a user standing thereon. As exemplarily shown in FIG. 2, the step pad 14 may be deployed in conjunction with a step post 40 that deploys longitudinally from a running board assembly 42 of the vehicle 12. When fully deployed, the step post 40 is positioned below and forward of the deployed step pad 14, thereby creating a stairwell for the user. However, it should be appreciated that the step pad 14 is capable of independent operation.

Figure 3:
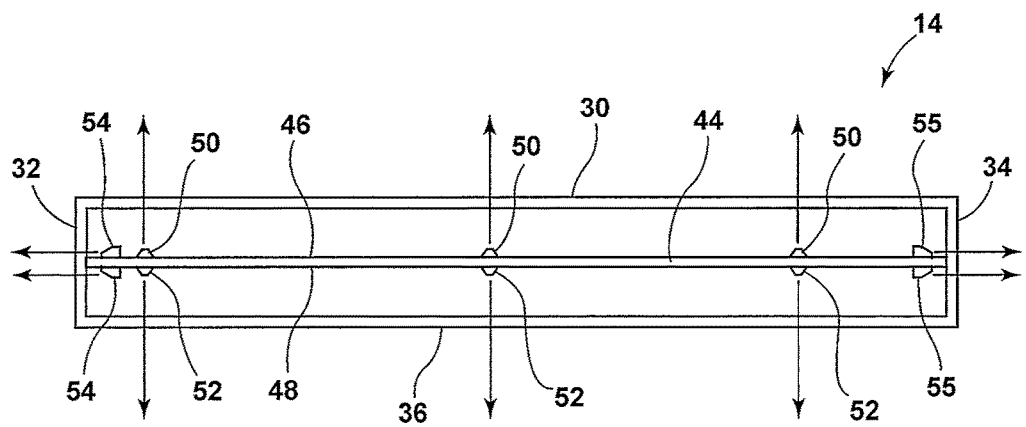
FIG. 3 is cross-sectional view of the step pad taken along line III-III of FIG. 2.

Referring to FIG. 3, a cross-sectional view of the step pad 14 is shown according to one embodiment. In the depicted embodiment, a double-sided printed circuit board (PCB) 44 is disposed inside the step pad 14 and may be secured therein by conventional means. The PCB 44 spans the length of the of the step pad 14 and includes a first side 46 facing the step area 30 of the step pad 14 and a second side 48 facing the bottom portion 36 of the step pad 14. A first light source is disposed on the first side 46 of the PCB 44 and includes a plurality of light-emitting diodes (LEDs) 50 configured to emit light toward the step area 30 of the step pad 14. Additionally or alternatively, a second light source is disposed on the second side 48 of the PCB 44 and includes a plurality of LEDs 52 configured to emit light toward the bottom portion 36 of the step pad 14. Additionally or alternatively, a third light source is disposed on the PCB 44 and includes a plurality of LEDs 54 located on one or both of the first and second sides 46, 48 of the PCB 44. The LEDs 54 are each configured to emit light toward the first side 32 of the step pad 14. Additionally or alternatively, a fourth light source is disposed on the PCB 44 and includes a plurality of LEDs 55 located on one or both of the first and second sides 46, 48 of the PCB 44. The LEDs 55 are each configured to emit light toward the second side 34 of the step pad 14.

In assembly, the LEDs 50, 52, 54, 55 may be variously spaced across the length of the PCB 44 to provide even illumination to the step area 30, the bottom portion 36, and the first and second sides 32, 34, respectively. In such an arrangement, the step pad 14 is constructed from a substantially light-transmissive material, thereby allowing light emitted by each of the LEDs 50, 52, 54, 55 to be transmitted from the step pad 14 in an outward direction as generally represented by the arrows stemming from each of the LEDs 50, 52, 54, 55. It is contemplated that the various surfaces of the step pad 14 may be dead fronted and/or partial vacuum metallized to generally conceal the internals of the step pad 14. It is to be understood that the number of LEDs 50, 52, 54, 55 are provided by way of example and more or less may be used if desired. In operation, each of the LEDs 50, 52, 54, 55 may illuminate in the same color or a different color. While the LEDs 50, 52, 54, 55 have been illustrated as single LEDs, it to be understood that each LED 50, 52, 54, 55 may alternatively correspond to a cluster of LEDs, each capable of illuminating in the same color or a different color.

Figure 4:
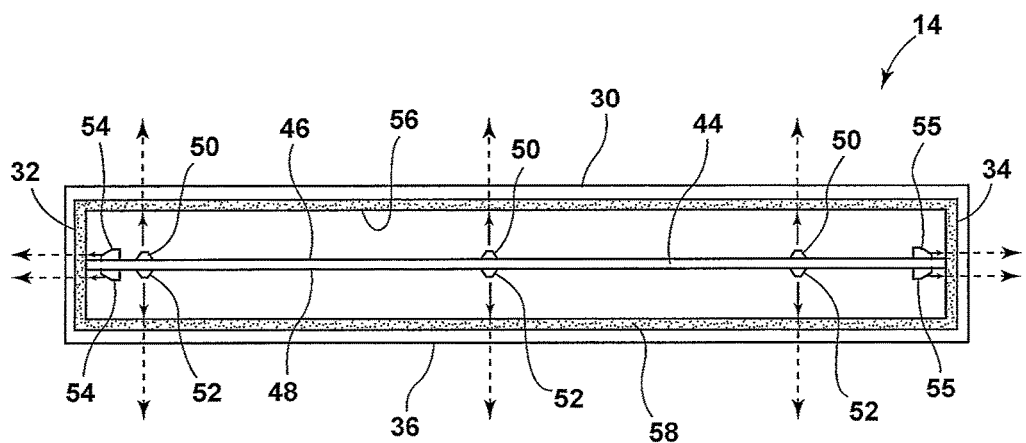
FIG. 4 illustrates an alternative embodiment of the step pad shown in FIG. 3.

Referring to FIG. 4, an alternative embodiment of the step pad 14 is shown. The step pad 14 is similar to that shown in FIG. 3 with the exception of a photoluminescent structure 56 coupled thereto. For purposes of illustration, the photoluminescent structure 56 is shown coupled to an underside of the step area 30, the bottom portion 36, and the first and second sides 32, 34 of the step pad 14, but may be otherwise coupled any of the foregoing structures in any combination. Alternatively, the photoluminescent structure 56 may be integrated with desired portions of the step pad 14 through a molding process, for example. In the depicted embodiment, the photoluminescent structure 56 includes one or more photoluminescent materials, such as long-persistence phosphors 58 configured to luminesce in one or more visible colors in response to light excitation provided by light emitted from the LEDs 50, 52, 54, 55. As depicted in FIG. 4, excitation light from each of the LEDs 50, 52, 54, 55 is generally represented by solid arrows whereas the resulting luminescent light emitted by the photoluminescent structure 56 is generally represented by dashed arrows and is outputted from the step pad 14 via the step area 30, the bottom portion 36, and the first and second sides 32, 34, respectively.

As defined herein, long-persistence phosphors are generally able to store excitation light and release light gradually, for a period of several minutes or hours, once the excitation light ceases to be provided. The decay time may be defined as the time between the end of excitation and the moment when the light intensity drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Accordingly, it is possible for portions of the step pad 14, as described herein, to luminesce at or above an intensity of 0.32 mcd/m$^2$ after the long-persistence phosphors 58 are exposed to the excitation light for a requisite period of time (e.g., 30 minutes), after which the long-persistence phosphors 58 will glow intensely for one or more hours and continue to emit a perceptible glow for upwards of 24 hours or more. Thus, it is contemplated that the LEDs 50, 52, 54, 55 may be operable on a timer to ensure adequate delivery of excitation light to the long-persistence phosphors 58 based on an expected intensity level thereof.

The long-persistence phosphors 58 may correspond to alkaline earth aluminates and silicates, for example doped di-silicates, or any other compound that is capable of emitting light for a period of time once excitation light is no longer present. The long-persistence phosphors 58 may be doped with one or more ions, which may correspond to rare earth elements, for example, $Eu^{2+}$, $Tb^{3+}$ and/or $Dy^3$. The long-persistence phosphors 58 may range in concentration and the photoluminescent structure 56 may also include variable amounts of stabilizing and performance-enhancing additives based on the weight of the formulation.

In operation, the long persistence phosphors 58 may be formulated to convert excitation light provided from the LEDs 50, 52, 54, 55 into visible light found in a conventional RGB color scale, including white light. It is to be understood that any long-persistence phosphor known in the art may be dispersed in the photoluminescent structure 56 in varying concentrations such that the step area 30, the bottom portion 36, and the first and second sides 32, 34 may be made to luminesce in the same color or different colors and continue to luminesce after the excitation light cease to be provided. However, it is to be understood that other phosphors, which do not necessarily exhibit long-persistence qualities, may also be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

Figure 5:
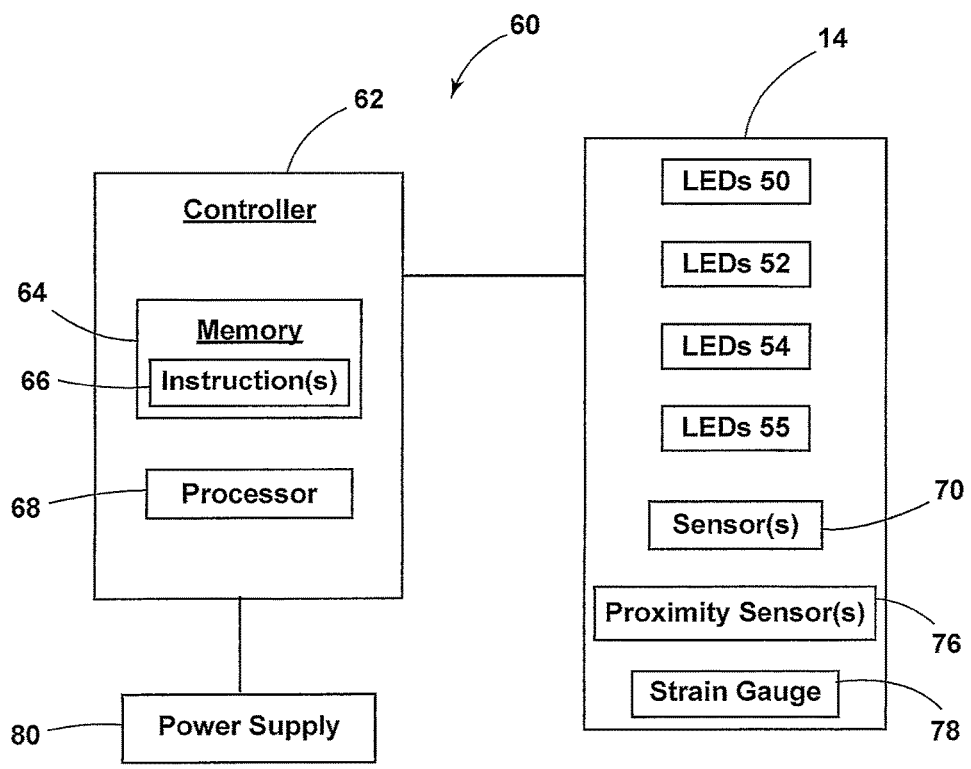
FIG. 5 illustrates a control system of the step assembly.

Referring to FIG. 5, a lighting system 60 is shown that incorporates the step pad 14 illustrated in FIG. 3, FIG. 4, or a combination thereof. The lighting system 60 includes a controller 62 operably connected to the LEDs 50, 52, 54, 55 and configured to independently control an illumination state thereof. The controller 62 may be provided inside the step pad 14 (e.g., on the PCB 44) or located on the vehicle 12 and includes a memory 64 having instruction(s) 66 stored thereon, that when executed by a processor 68, control the LEDs 50, 52, 54, 55 of the step pad 14 to effectuate a variety of lighting applications. The activation of the LEDs 50, 52, 54, 55 may be conditioned upon the step pad 14 being positioned in one of the stowed and deployed positions. Accordingly, it is contemplated that the step pad 14 may include one or more sensors 70 for communicating the position of the step pad 14 to the controller 62. For example, the sensor(s) 70 may include a magnetic sensor, a proximity sensor, a capacitive sensor, an accelerometer, or a combination thereof. The sensor(s) 70 may be incorporated inside the step pad 14 and/or have components provided on the vehicle 12.

Figure 6:
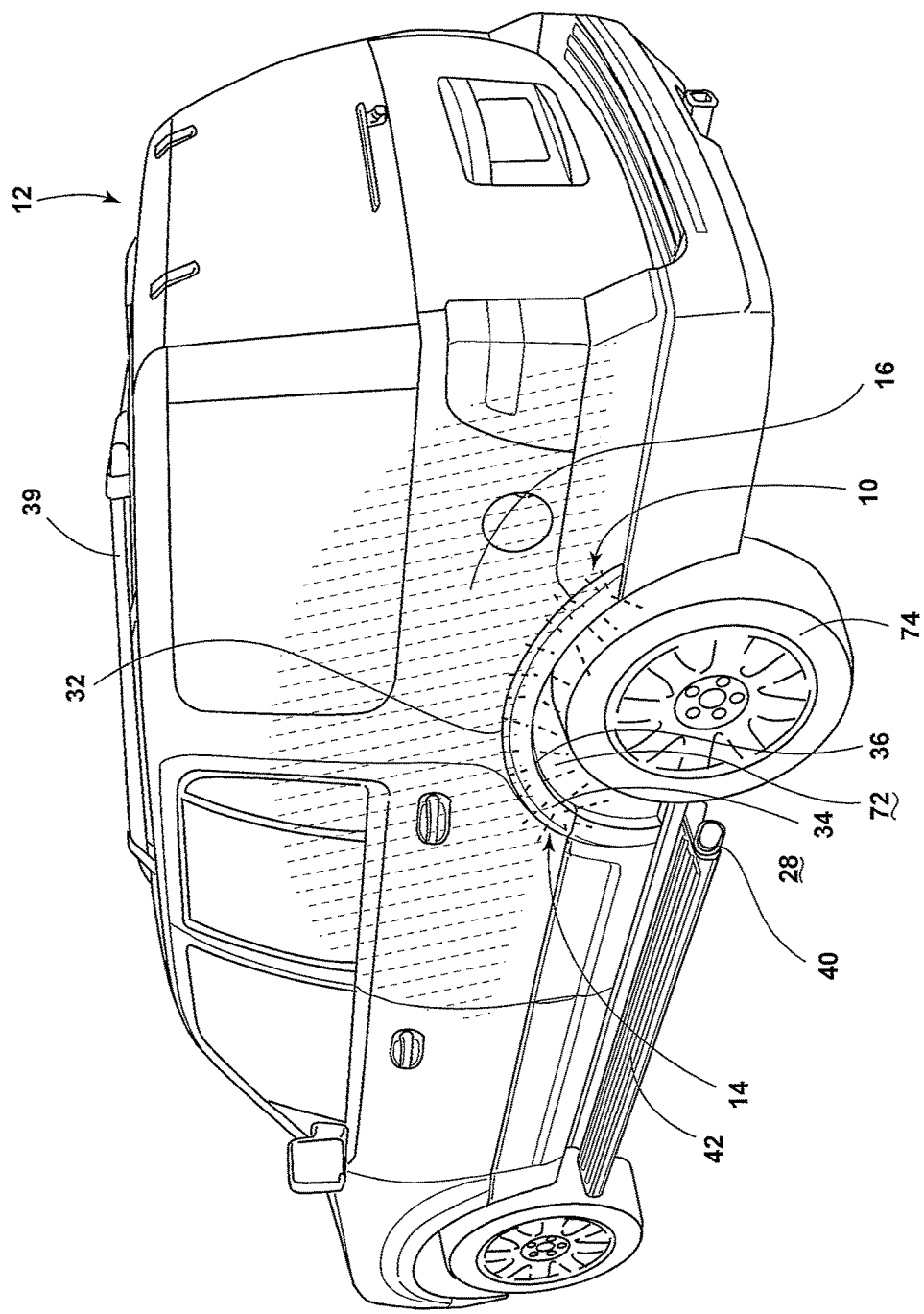
FIG. 6 is a side perspective view illustrating several lighting applications implemented by the step assembly when the step pad is in the stowed position.

In one exemplary scenario, where the step pad 14 is in the stowed position, the controller 62 may activate LEDs 52 such that the bottom portion 36 of the step pad 14 illuminates or luminesces in a visible color in an outward-vehicle direction, as exemplarily shown in FIG. 6. For example, the LEDs 52 may be operated as an auxiliary lamp (e.g., flashed as a turn signal), such that illumination or luminescence of the bottom portion 36 indicates an intended action of a driver of the vehicle 12. Additionally or alternatively, the bottom portion 36 of the step pad 14 may be made to illuminate or luminesce during a welcome or farewell event that is typically initiated when the vehicle 12 is in a parked position and an occupant is approaching, embarking, or exiting the vehicle 12. In such a scenario, LEDs 54 and/or 55 may also or alternatively be activated, thereby causing respective first and second sides 32, 34 to illuminate or luminesce in a visible color to produce sconce lighting against a side of the vehicle 12 and downward lighting of a wheel well space 72, respectively. The side of the vehicle 12 may include portions of the rear quarter panel 16 and other areas proximate thereto and the lighting of the wheel well space 72 may assist an individual with performing maintenance (e.g., changing a tire 74) in poorly lit conditions.

Figure 7:
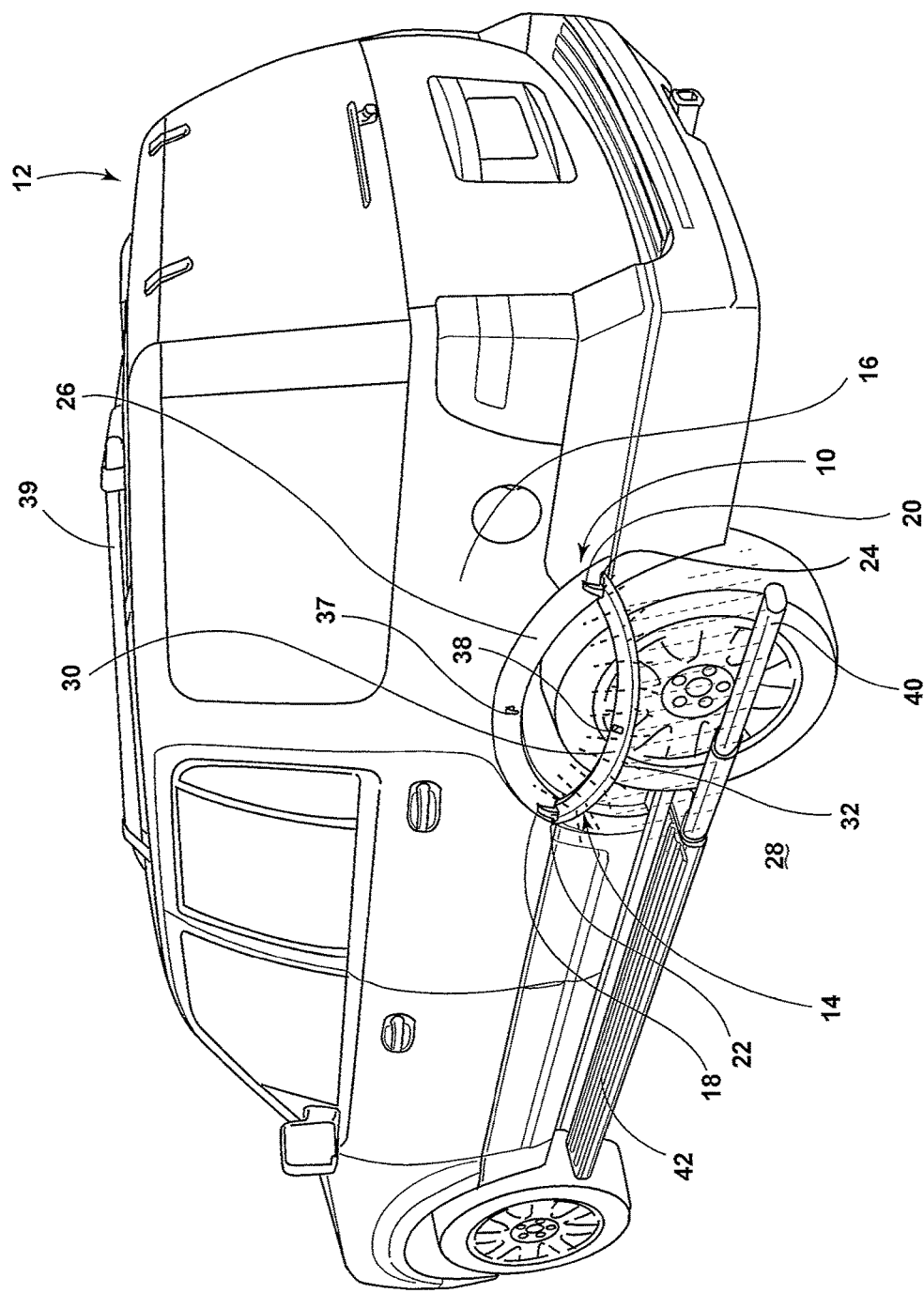
FIG. 7 is a side perspective view illustrating several lighting applications implemented by the step assembly when the step pad is in the deployed position.

In another exemplary scenario, where the step pad 14 is in the deployed position and the vehicle 12 is typically in a parked position, the controller 62 may activate LEDs 50 such that the step area 30 illuminates or luminesces in a visible color to visually identify the step area 30 in poorly lit conditions or otherwise impart a stylistic element to the step area 30, as exemplarily shown in FIG. 7. Additionally or alternatively, the controller 62 may activate LEDs 52 to function as a puddle lamp by causing the bottom portion to illuminate or luminesce in order to light up the ground surface 28 along with the step post 40, if available. Additionally or alternatively, the controller 62 may activate LEDs 54 such that the first side 32 of the step pad 14 illuminates or luminesces in a visible color to serve as a warning light to oncoming vehicles.

It should be appreciated that the scenarios described above are provided merely as examples and it will be apparent to those skilled in the art that the LEDs 50, 52, 54, 55 may be operated in other manners to effectuate other lighting applications based on the position of the step pad 14. With respect to the scenarios described herein, the LEDs 50, 52, 54, 55 may be activated on a timer such that they deactivate after a predetermined time has elapsed. In some instances, it is contemplated that one or more of the LEDs 50, 52, 54, 55 may be activated or reactivated upon detection of an individual proximate the vehicle 12. This may be achieved through proximity sensors already on the vehicle 12 or one or more proximity sensors 76 operably coupled to the step pad 14. Further, it is contemplated that one or more of the LEDs 50, 52, 54, 55 may be activated or deactivated based on whether someone is detected to be standing on the step area 30 through the use of a strain gauge 78 or other similar device operably coupled to the step pad 14.

Figure 8:
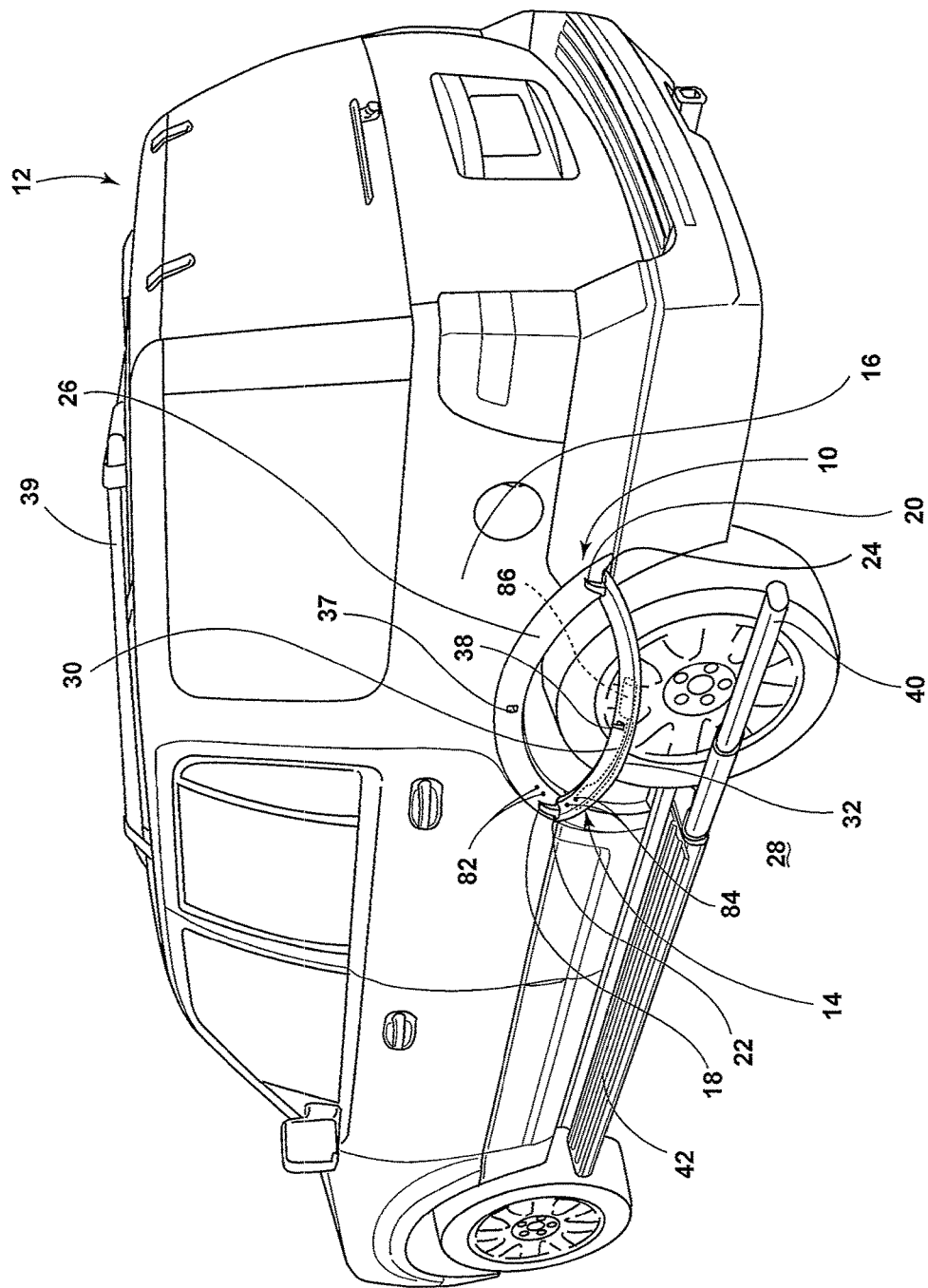
FIG. 8 is a side perspective view showing a power transfer system of the step pad assembly.

In operation, the controller 62 may supply power to the LEDs 50, 52, 54, 55 via a power supply 80 of the vehicle 12 in a variety of manners. According to one embodiment shown in FIG. 8, one or more power contacts 82 may be provided at the wheel well trim member 26 and configured to inductively mate with a complimentary power contact(s) 84 provided on the step area 30 of the step pad 14 when the step pad 14 is in the stowed position. When mated, the power contacts 82, 84 inductively charge an energy storage device 86 (e.g., a battery) disposed inside the step pad 14 and operably connected to the LEDs 50, 52, 54, 55, thereby enabling temporary operation of the same when the step pad 14 is in the deployed position. Alternatively, power may be routed to the LEDs 50, 52, 54, 55 via hinges 18 and 20 or any manner known in the art.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A step assembly of a vehicle comprising:
   a step pad pivotally coupled to a quarter panel of the vehicle and movable between a stowed position and deployed position; and
   at least one light source provided in the step pad, wherein the step pad transmits light emitted by the at least one light source in an outward direction, and wherein the at least one light source is operated based on whether someone is detected to be standing on a step area of the step pad through the use of a strain gauge.

2. The step assembly of claim 1, wherein light emitted by the at least one light source is transmitted through a side portion of the step pad to produce one of a sconce lighting against a side of the vehicle and an outward-vehicle illumination based on the step pad being in one of the stowed and deployed position.

3. The step assembly of claim 1, wherein light emitted by the at least one light source is transmitted through a step area of the step, the step area defining a top portion of the step pad when the step pad is in the deployed position.

4. The step assembly of claim 1, wherein light emitted by the at least one light source is transmitted through a side portion of the step pad to illuminate a wheel well space of the vehicle when the step pad is in the stowed position.

5. The step assembly of claim 1, wherein light emitted by the at least one light source is transmitted through a bottom portion of the step pad to produce one of a vehicle-outward illumination and a downward directional lighting toward a ground surface based on the step pad being in one of the stowed and deployed position.

6. The step assembly of claim 1, further comprising a plurality of contacts that are mated to one another when the step pad is in the stowed position and are configured to inductively charge an energy storage device disposed inside the step pad and operably connected to the at least one light source.

7. A step assembly of a vehicle, comprising:
   an arched step pad pivotally coupled to a rear quarter panel of the vehicle and movable between a stowed position covering a wheel well trim member and a deployed position substantially parallel with a ground surface;
   at least one light source provided in the step pad, wherein the step pad transmits light emitted by the at least one light source in an outward direction; and
   a plurality of contacts that are mated to one another when the step pad is in the stowed position and are configured to inductively charge an energy storage device disposed inside the step pad and operably connected to the at least one light source.

8. The step assembly of claim 7, wherein light emitted by the at least one light source is transmitted through a side portion of the step pad to produce one of a sconce lighting against a side of the vehicle and an outward-vehicle illumination based on the step pad being in one of the stowed and deployed position.

9. The step assembly of claim 7, wherein light emitted by the at least one light source is transmitted through a step area of the step, the step area defining a top portion of the step pad when the step pad is in the deployed position.

10. The step assembly of claim 7, wherein light emitted by the at least one light source is transmitted through a side portion of the step pad to illuminate a wheel well space of the vehicle when the step pad is in the stowed position.

11. The step assembly of claim 7, wherein light emitted by the at least one light source is transmitted through a bottom portion of the step pad to produce one of a vehicle-outward illumination and a downward directional lighting toward a ground surface based on the step pad being in one of the stowed and deployed position.

12. The step assembly of claim 7, wherein the at least one light source is operated based on whether someone is detected to be standing on a step area of the step pad through the use of a strain gauge.

13. A step assembly of a vehicle comprising:
    a step pad pivotally coupled to a quarter panel of the vehicle and movable between a stowed and deployed position, the step pad including at least one portion configured to luminesce in response to excitation light by at least one light source, wherein the at least one light source is provided on a printed circuit board disposed inside the step pad.

14. The step assembly of claim 13, wherein the step pad is hinged to a rear quarter panel of the vehicle and covers a wheel well trim member when in the stowed position and is substantially parallel with a ground surface when in the deployed position.

15. The step assembly of claim 13, wherein the step pad includes a photoluminescent structure having long-persistence phosphors configured to store the excitation light and continue to luminesce for a period of time once the excitation light ceases to be provided.

16. The step assembly of claim 13, wherein the step pad includes a top portion, a bottom portion, and side portions, each configured to luminesce singly or in combination based on the step pad being in one of the stowed and deployed positions.

17. The step assembly of claim 13, further comprising a controller in communication with at least one sensor to control an operational state of the at least one light source, wherein the at least one sensor includes one of a magnetic sensor, a proximity sensor, a capacitive sensor, an accelerometer, and a strain gauge.

* * * * *